United States Patent [19]

Mouly et al.

[11] Patent Number: 4,866,788
[45] Date of Patent: Sep. 12, 1989

[54] PROCESS FOR CONTROLLING RETRANSMISSION OF MESSAGES FROM TRANSMITTING STATIONS BELONGING TO A CELLULAR SYSTEM

[76] Inventors: Michel Mouly, 72 rue Jean Blenzen, 92170 Vanves; Rémi Thomas, 203 rue la Fayette, 75010 Paris, both of France

[21] Appl. No.: 112,725

[22] Filed: Oct. 23, 1987

[30] Foreign Application Priority Data

Oct. 24, 1986 [FR] France ................................ 8614805

[51] Int. Cl.$^4$ ............................................. H04B 1/60
[52] U.S. Cl. .......................................... 455/9; 455/33; 455/54; 455/67; 340/825.5
[58] Field of Search ...................... 455/33, 34, 55–58, 455/9–11, 12, 52, 53, 67, 15, 226; 379/59–63; 340/825.5

[56] References Cited

U.S. PATENT DOCUMENTS

| | | | |
|---|---|---|---|
| 4,400,585 | 8/1983 | Kaman et al. | 455/34 |
| 4,670,899 | 6/1987 | Brody et al. | 455/33 |
| 4,716,407 | 12/1987 | Borras et al. | 455/54 |
| 4,747,101 | 5/1988 | Akaiwa et al. | 455/34 |

OTHER PUBLICATIONS

IEEE Transactions on Information Theory, IT-31, vol. 2, pp. 295–301, Mar. 1985, M. SIDI, "Splitting Protocols in Presence of Capture".
IEEE Transactions on Information Theory IT-31, No. 2, pp. 124–142, Mar. 1985, R. G. Gallagher, "A Perspective in Multaccess Channels".
IEEE Transactions on Communication, pp. 447–448, Apr. 1976, Metzer, "On Improving Utilization in ALOHA Networks".
Globe Com. '85 IEEE Globe Communications Conference, New Orleans, Conference Record, vol. 2 of 3, Dec. 1985, pp. 32.4.1–32.4.7, Goodman et al.
IEEE Transactions on Communication, vol. Com-31, No. 2, pp. 253–264, Feb. 1983, N. Shacham, "A Protocal for Preferred Access in Packet-Switching Radio Networks".

Primary Examiner—Robert L. Griffin
Assistant Examiner—Curtis Kuntz
Attorney, Agent, or Firm—Michael N. Meller

[57] ABSTRACT

A process for controlling retransmission of messages from transmitting stations belonging to a cellular system. The stations transmit messages to a fixed base station, e.g. for requesting the allocation of a dedicated channel for the communication. These messages pass via a single transmission channel shared by a large number of transmission stations. A retransmission of these messages takes place when at least two stations have simultaneously attempted to use this common channel, so that there is a collision and a blockage of the stations in question. The probability of the retransmission of a request message via the shared channel is a function of the state of the shared channel and the power received by the base station from the transmitting station.

1 Claim, 2 Drawing Sheets

PROCESS FOR CONTROLLING RETRANSMISSION OF MESSAGES FROM TRANSMITTING STATIONS BELONGING TO A CELLULAR SYSTEM

DESCRIPTION

In numerous telecommunications systems, use is made of a channel, a so-called shared channel, to which the transmitting-receiving stations have access in a random manner. This is e.g. the case with cellular radio-mobile networks, where the mobile stations of the same cell, which request a dedicated channel for their communications, pass through such a shared channel in order that said request can reach a fixed receiver, which is called the base station.

When a mobile station has not yet carried out a transmission, it is said to be active. As soon as an active mobile station is able to transmit a request, it transmits it, no matter what the behavior of the other stations, hence the random character of the access. Thus, several mobiles are able to transmit their requests at the same time. There is then said to be a collision and all the corresponding messages could be lost. Transmitters informed of such a collision are said to be blocked. Thus, the blocked transmitters must retransmit their request messages. However, it is clear that no matter what repeat procedure is used, it is not necessarily effective. Thus, if, for example, the transmitters which have just been blocked immediately retransmit their message, it is obvious that a collision again occurs. This will occur to an increasing extent, because transmitters attempting to transmit for the first time during this first repeat of the messages, will also enter into collision. It is therefore necessary to choose a good retransmission procedure for the request messages.

This problem is obviously not new and since 1970 there has been a group of processes offering appropriate solutions. They consist of random access protocols of the so-called ALOHA type. These protocols are e.g. described in the article by N. ABRAMSON entitled "The ALOHA System; Another Alternative for Computer Communications", published in Proc. 19 Fall Joint Computer Conference, AFIPS Press, vol. 37, pp. 281-285.

Reference is made to synchronous ALOHA, when the transmissions are synchronized with time intervals. The lengths of these intervals are all equal and the transmissions start at the beginning of an interval. An interval is sufficient to enable a packet to be transmitted and for the mobile station to have time to receive the acknowledgement from the base station. In other words, an interval is sufficient for a packet to be transmitted and for the mobile station to know whether or not said transmission has succeeded.

The ALOHA system is based on the following idea. During the intervals following a collision, it is not possible for a transmitting station to reliably retransmit and this can only take place with a certain probability f. More specifically, the station tries to retransmit with a probability f and does not try to retransmit with a probability 1−f and this takes place up to successful retransmission. With regards to the probability f, there are two solutions, i.e. either f is fixed, or f is dependent on the state of the shared channel and in the first case reference is made to a "controlled system".

An uncontrolled ALOHA channel is unstable and the number of blocked transmitters increases indefinitely. In order that a controlled ALOHA channel be stable, it necessary and is sufficient for f to be in the form: $f(k) = a/N(k)$, in which $N(k)$ is the number of blocked transmitters during the kth interval and $f(k)$ is the probability of a blocked transmitter attempting to retransmit during this interval. These properties are described in the article by G. FAYOLLE, E. GELENBE, J. LABETOULLE entitled "Stability and Optimal Control of the Packet Switching Broadcast Channel", and published in J. Asso. Comput. Mach., vol. 24, pp. 375-386, July 1977.

The controlled synchronous ALOHA system has the advantage of ensuring the stability of the channel, but its efficiency is low, Theory shows that it is at a maximum equal to $1/e$, i.e. approximately 0.368. Efficiency is understood to mean the mean value of the number of transmitters authorized to transmit for the first time during an interval, without said flow leading to the collapse of the system, i.e. the indefinite increase of the number of blocked transmitters. This mean value is also the capacity of the channel.

Another disadvantage of controlled ALOHA systems is that of not taking into account a phenomenon called capture, which is as follows. In reality, when two or more stations transmit at the same time, all the messages are not necessarily lost. It is possible for at the most one message to reach the base station. This event is dependent on the signal to noise ratio concerning this message, the other messages being considered as noise with respect thereto.

The controlled ALOHA system cannot take account of the capture phenomenon, because it does not differentiate between the different transmitters with regards to their power levels. However, again taking the example of a radio-mobile system in the same cell, the base station receives signals which can be of very different power levels for various reasons relating to the environment of the stations.

The object of the present invention is to obviate these disadvantages. To this end, it provides a process making it possible to take account of the capture phenomenon, which significantly improves, for a small additional cost, the efficiency of the shared channel. Taking account of capture requires taking account of the power differences between the mobile transmitters. Specifically within the present invention, it is a question of making the retransmission of the blocked transmitters dependent on their power levels. The retransmission principle according to the invention consists of making $f(k)$, the probability of retransmission by a blocked transmitter during the interval k, dependent on two data:

the activity of the channel in each interval (success, failure, non-use) and the power of the transmission received by the base station with respect to a certain reference.

BRIEF DESCRIPTION OF THE DRAWINGS

The invention will be described in detail hereinafter with reference to the drawings, wherein.

DETAILED DESCRIPTION OF THE PREFERRED EMBODIMENT

Figure 1:
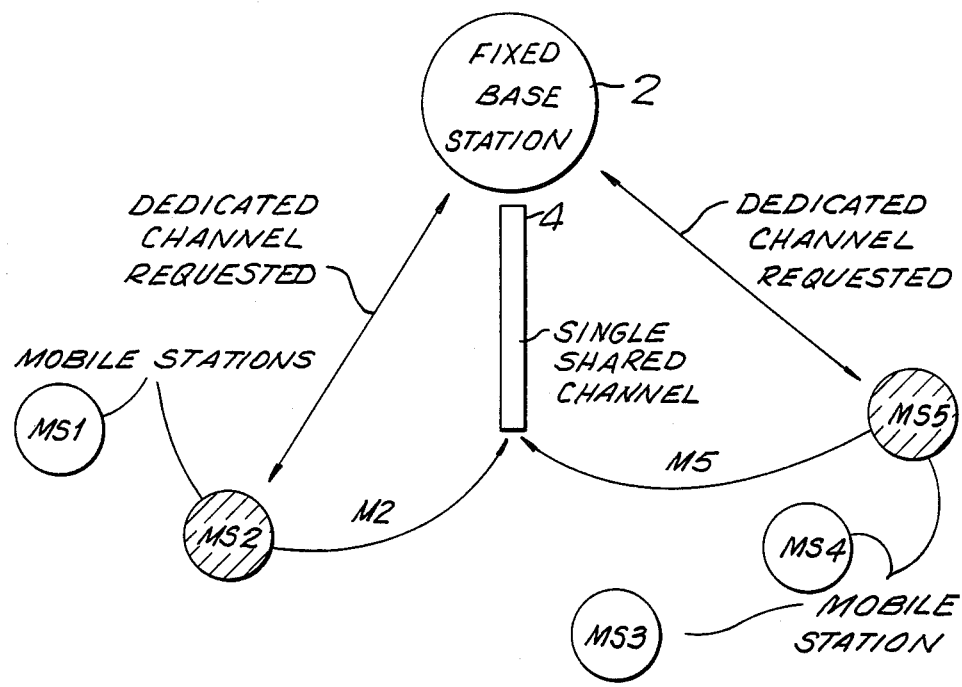
FIG. 1 is a diagram showing a collision between mobile stations in a cellular transmission system in accordance with the invention.

FIG. 1 shows a collision between two mobile stations MS2 and MS5 in a cellular transmission system comprising a fixed base station 2 and mobile stations MS1 to MS5. In response to a need for a dedicated channel for radiocommunications, both mobile stations MS2 and MS5 send messages (M2 and M5 respectively) to the fixed base station 2 over a single shared channel 4. There is a collision between messages M2 and M5 and no dedicated channel is allowed.

Figure 2:
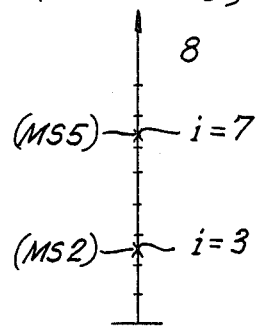
FIG. 2 is a diagram of the power levels of the received messages in accordance with the invention.

As shown in FIG. 2, the fixed base station 2 measures the power level of the respective received messages M2 and M5. The power scale is divided into p levels. In the preferred embodiment p=8. Each level is identified by an integer i, where i varies from 1 to p. In the case depicted, message M2 has a power level i=3 and message M5 has a power level i=7.

Figure 3:
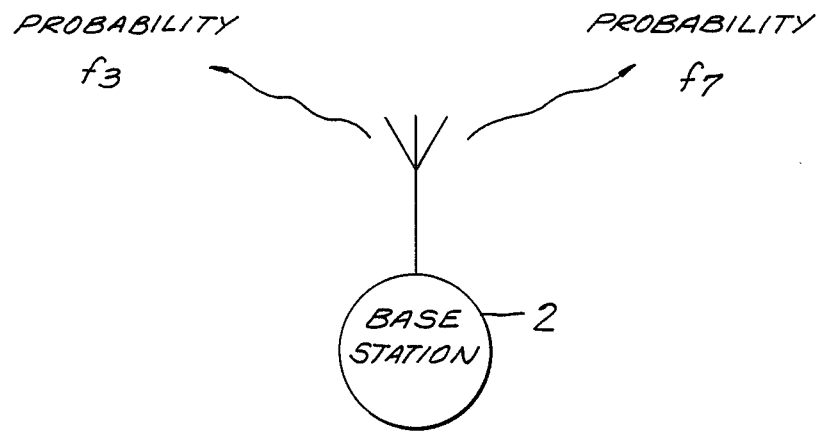
FIG. 3 is a diagram showing the transmission of probabilities of retransmission from the base station in accordance with the invention.

In response to the collision between messages M2 and M5, the fixed base station 2 computes the probabilities of retransmission of mobile stations MS2 and MS5 in dependence on the state of the single shared channel and the respective power levels i. For mobile stations MS2 and MS5, these probabilities are $f_3$ and $f_7$ for i=3 and i=7 respectively. These probabilities $f_3$ and $f_7$ are broadcast by the fixed base station 2, as shown in FIG. 3.

Figure 4:
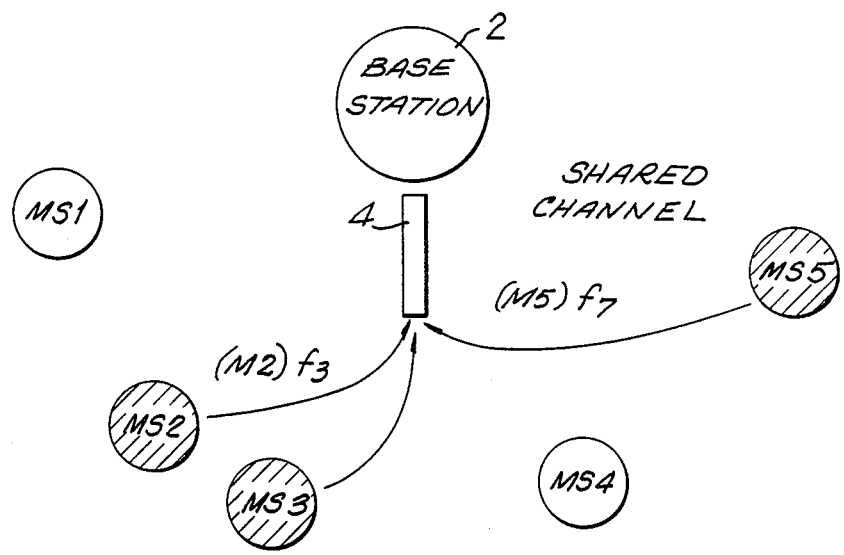
FIG. 4 is a diagram showing transmission after a collision in accordance with the invention.

FIG. 4 depicts the situation where mobile stations MS2 and MS5 retransmit their messages in a random manner with probabilities $f_3$ and $f_7$ respectively. In most cases the collision will be suppressed. In the meantime, however, another mobile station, e.g., MS3, may transmit a message through the single shared channel, since none of the mobile stations are blocked during this process. If a new collision appears as the result of such a transmission from another mobile station, the above-described process is repeated.

Thus, in the invention, the probabilities of retransmission vary with the power level, so that the mobile stations are differentiated.

It is then possible to obtain an efficiency greater than 1/e, but in particular for the same arrival flow, there will be better delay or time lag conditions, while only leading to a small additional cost. The invention then makes it possible to reduce the radio resource and the quantity of equipments necessary for controlling a given number of mobile transmitters. Each transmitting station can be referenced relative to a power scale and this determination takes place on the basis of a connection balance performed by the mobile station with the base station of the cell where it is located. There is no difficulty in establishing this balance and it constitutes a procedure already provided for other aspects of communications. The transmitting station performs this operation just before starting to transmit its first request to the base station.

Moreover, the activity of the channel is an information which will be estimated by the base station and which it will retransmit to all the stations belonging to its cell. The base station is able to count the number of messages correctly received and the number of unused intervals. Thus, each mobile station will determine its retransmission frequency as a function of two informations, namely the connection balance which it has effected and the activity of the channel received from the base station.

The power level of a transmitter can assume all the values included in an interval, whose terminals are defined by certain physical constraints. Consideration is given to discrete power ranges by subdividing said power range into p layers corresponding to p different power levels. Layer 1 corresponds to the highest level and layer p to the lowest level. This subdivision will be a characteristic of the cell and will not vary over a period of time, no matter what the evolution of the shared channel. The connection balance enables the transmitting station to determine to which of these layers it belongs.

Once this determination has taken place, the station can be considered as not changing layer. This is clearly an approximation because the situation of a mobile station can evolve as a result of its movements. However, this approximation is completely justified by the fact that these variations are slow compared with the duration of the phenomenon in question, which is the time necessary for the success of the transmission of its request.

Specifically, the use of this determination is as follows. If a blocked transmitter belonging to layer i seeks to retransmit during the interval of rank k, it will do this with a probability of $f_i(k)$. Thus, this retransmission probability is dependent on the power of the transmitting station (layer i) and of the time (interval of rank k). The latter element permits an evolution as a function of the state of the system at any time. The state of the system at a given time (during an inerval) is dependent on the number $N(k)$ of transmitters blocked at this time.

It is then possible to set $f_i(k)=a_i/N(k)$. For any i, $a_i$ is a constant calculated for optimizing the flow of layer i and the total flow. Following this estimate and knowing the constants $a_i$, the base station will be able to calculate and broadcast the probability $f_i$. However, said estimate of $N(k)$ is relatively difficult to realize and a further variant is provided in the invention.

It is firstly necessary for the base station to be able to have a supplementary information, namely the origin of each detected transmission. After making its connection balance, any station knows in which of the p layers it is located. It can then join to each of its transmissions an information field for identifying said layer. In this way, the base station is able to estimate the flowrate of each layer. This consists of a supplementary information compared with the standard case where the base station can only establish for each interval one of the three following situations: inactivity, success, failure. With this supplementary information, the base station can establish one of the p+2 following situations: inactivity, success in layer i where $1 \leq i \leq p$, failure.

Inactivity corresponds to the case where the base station hears nothing. A success in layer i signifies that a message has been detected and that it came from a transmitter corresponding to layer i. Failure takes account of the situation where a noise is heard, which means that one or more transmitters have attempted to transmit, but that there has been no correct detection.

Thus, N components would be available in the base station following interval k, corresponding to the results of intervals ranging from $k+1-N$ to k. These results will be used for the adjustment of $f_i(k+1)$ as a function of $f_i(k)$. For any layer i, at the end of any interval k, the results will be broadcast by the base station.

A possible adjustment algorithm will now be described. Having the information by the aforementioned N components, it is possible to use the following estimator p(k):

$$p(k) = (1/N) \sum_{i=0}^{N-1} s(k - i);$$

with:

$$\begin{cases} s(j) = 1 \text{ if there was no activity during interval } j; \\ s(j) = 0 \text{ in the opposite case.} \end{cases}$$

Thus, p(k) gives information on the inactivity level of the channel:
if $p(k) < A$, in which A is a reference parameter, the activity is very great and reduction will take place of $f_i(k+1)$;
if $p(k) > A$ the activity is too low and $f_i(k+1)$ will be increased.

It is also possible to use the following estimator:

$$D_i(k) = (1/N) \sum_{j=1}^{N} X_i(k - j + 1);$$

with:
$X_i(j) = 1$ if layer i has had a success during interval j;
$X_i(j) = 0$ in the opposite case.

Thus, $D_i$ indicates the successes in layer i during the N preceding intervals.

Using these two indicators, it is possible to define the adjustment algorithm, three cases being distinguished:
Case 1: $p(k) < A - m_i$ and $D_i(k) < K^i - n_i$
Case 2: $D_i(k) \geq K^i - n_i$
Case 3: $p(k) \geq A - m_i$ and $D_i(k) < K^i - n_i$
in which A and ki are constants dependent on the characteristics of a given cell. Coefficients $m_i$ and $n_i$ are strictly positive real coefficients.

As a function of the particular case in question, a choice is made:

$$f_i(k + 1) = \begin{cases} \dfrac{f_i(k)}{1 + r_i} & \text{in the case 1} \\ f_i(k) & \text{in the case 2} \\ \dfrac{f_i(k)}{1 - s_i} & \text{in the case 3} \end{cases}$$

in which $r_i$ and $s_i$ are also strictly positive real coefficients.

Finally, an article by L. GEORGIADIS and PAPANTONI-KAZAKOS entitled "A Collision Resolution Protocol for Random Access Channels with energy Detectors" published in the journal "IEEE Trans. on Com.", vol. Com-30, no. 11, November 1982, pp. 2413–2420, a description is given of a retransmission control process whose principle is as follows. When a collision has taken place during an interval, the base station prevents the transmitters not involved in this collision from transmitting until the collision has been solved, i.e. until all the transmitters involved in the collision have been able to correctly pass their messages. The control is based on the knowledge of the number of mobile stations involved in a collision. However, it is precisely the knowledge of this information which is scarcely ever available in a radio-mobile network. Moreover, this algorithm does not take account of the power differences between the transmitters.

This idea of preventing any transmission before the resolution of the collision is also mentioned in the article by I. CIDON and M. SIDI entitled "The Effect of Capture on Collision-Resolution Algorithms" published in "IEEE Trans. on Com.", vol. Com-33, no. 4, April 1985, pp. 317–324. However, in such a case the system is not controlled and account is taken of the capture, the retransmission probabilities being dependent on only the power. The proposed algorithm is therefore apparently close to the system according to the invention, but has two important differences:
- the absence of control (the retransmission probabilities after a collision do not vary as a function of the number of blocked transmitters or in other words the state of the system),
- the fact that new arrivals are prevented from having access to the channel during the collision solving period.

Thus, the system according to the invention is the only system having the following characteristics at the same time:
- it is a random access system,
- there is no control on the new arrivals,
- there is a control of the retransmission as a function of the state of the system and as a function of the power differences between transmitters, in order to take account of capture.

Moreover, the system according to the invention is particularly suitable for the control of retransmissions in a radio-mobile network cell.

We claim:

1. A process for controlling mobile transmitting stations belonging to a cellular radio-transmission system having a fixed base station, comprising the following steps:
transmitting a message from said mobile transmitting stations through a single transmission channel shared by said mobile transmitting stations to said fixed base station to request an allocation of a dedicated channel for communication;
detecting for the presence of a collision involving at least two of said messages from at least two of said mobile transmitting stations through said single transmission channel, said collision producing blocked mobile transmitting stations without allocated dedicated channel;
measuring in said fixed base station the respective power levels of said messages received by said fixed base station from said mobile transmitting stations;
subdividing a range of power into a set of p different levels from a highest power level to a lowest power level, where p is an integer;
determining the respective levels i corresponding to each of said measured power levels for each of said blocked mobile transmitting stations, i being an integer between 1 and p;
computing in said fixed base station a probability $f_i$ of retransmission for each of said blocked mobile transmitting stations, said probability $f_i$ being a function of the respective power level i and a function of the number of blocked mobile transmitting stations;

broadcasting from said fixed base station said probability $f_i$ for each of said blocked mobile transmitting stations; and retransmitting said respective messages from each of said blocked mobile transmitting stations with said probability $f_i$.

* * * * *